May 17, 1927.

E. G. LAWRENCE 1,629,347

ALARM SYSTEM FOR VAULTS

Filed March 9, 1925

Inventor
Edward G. Lawrence
By his Attorneys

May 17, 1927.  E. G. LAWRENCE  1,629,347
ALARM SYSTEM FOR VAULTS
Filed March 9, 1925    6 Sheets-Sheet 2
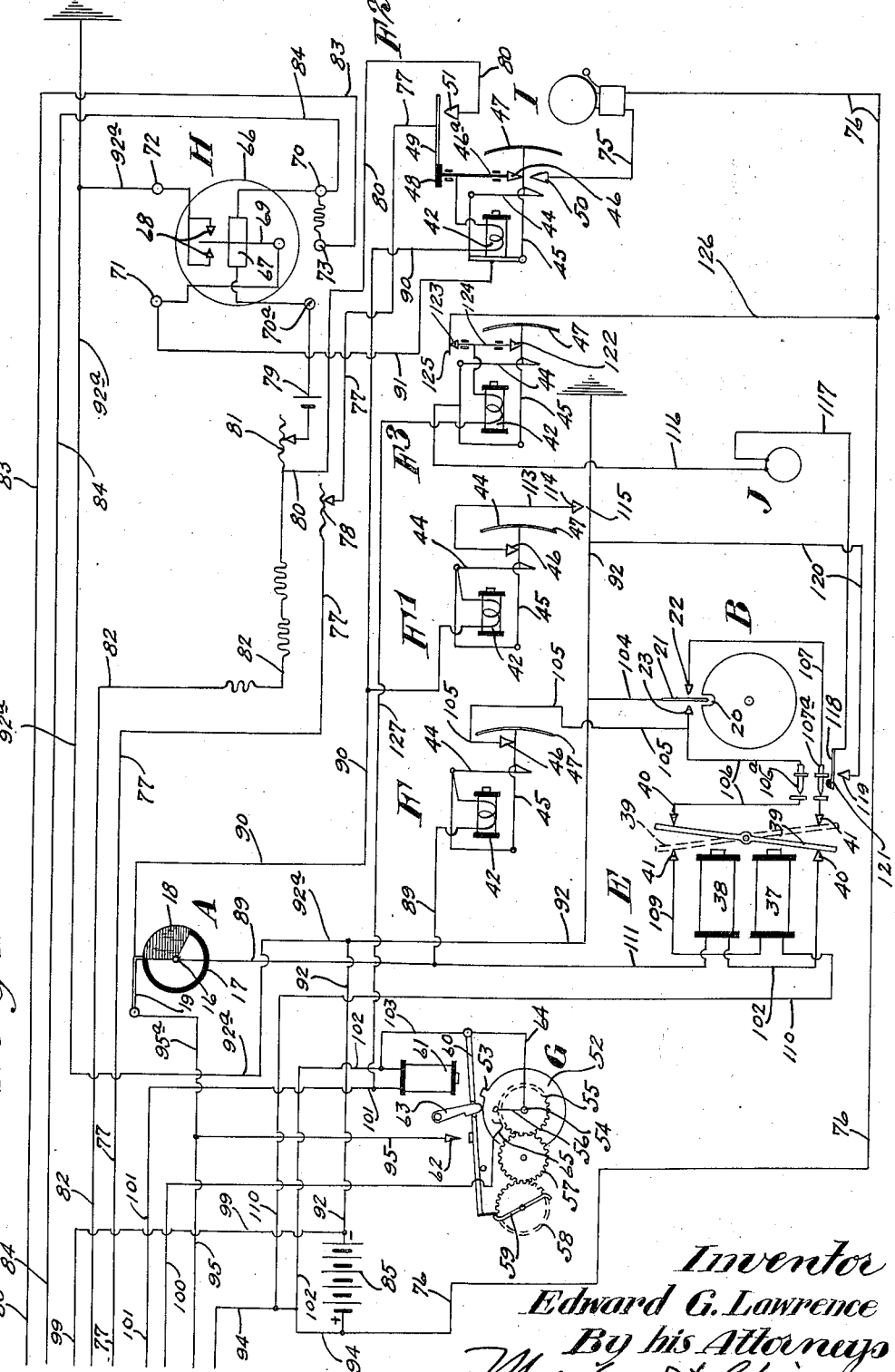

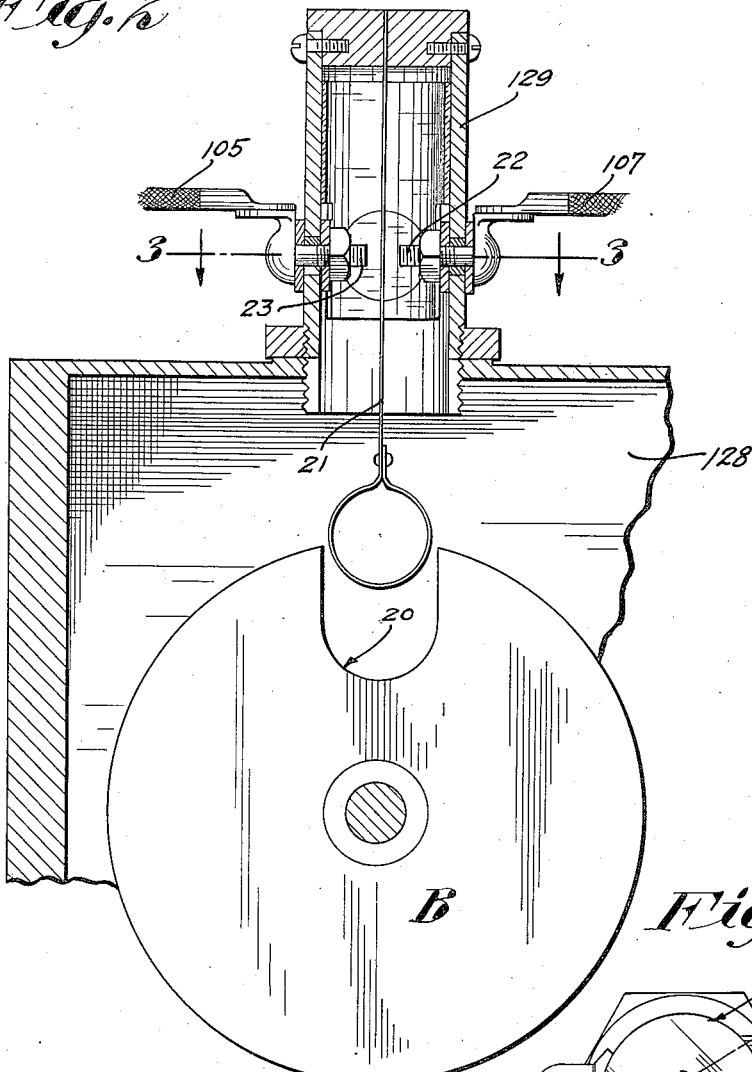

May 17, 1927. 1,629,347

E. G. LAWRENCE

ALARM SYSTEM FOR VAULTS

Filed March 9, 1925 6 Sheets-Sheet 4

Inventor
Edward G. Lawrence
by his Attorneys

May 17, 1927.
E. G. LAWRENCE
ALARM SYSTEM FOR VAULTS
Filed March 9, 1925
1,629,347
6 Sheets-Sheet 5
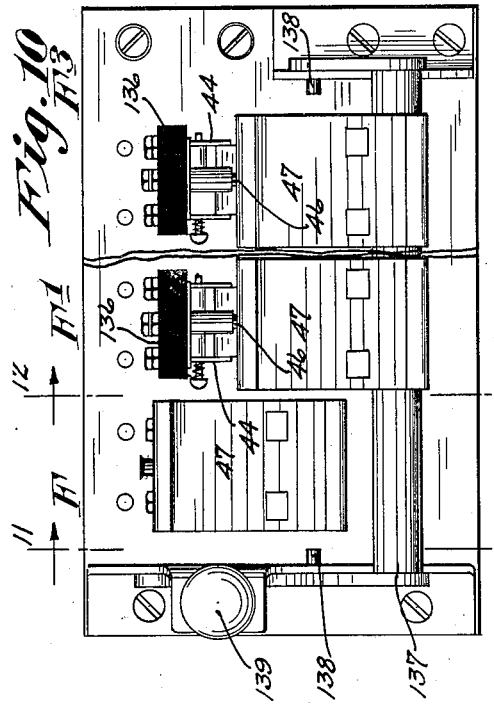
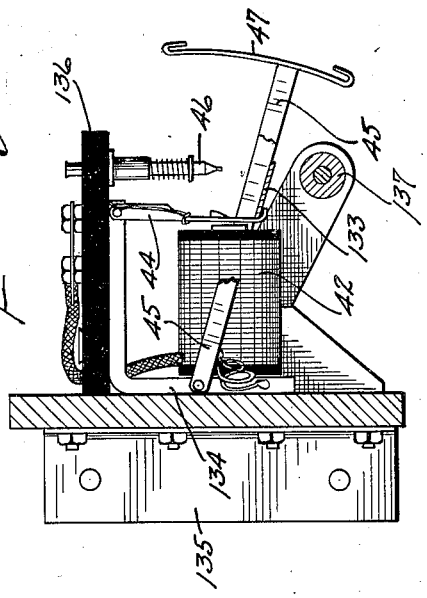
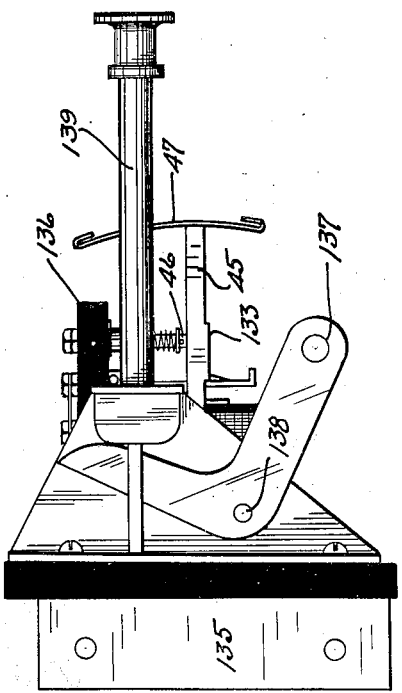
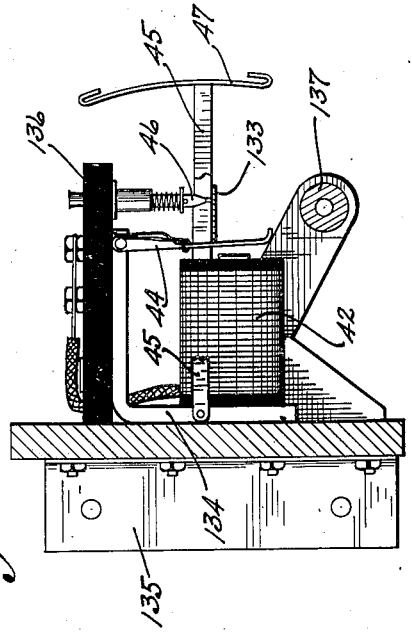
Inventor
Edward G. Lawrence
By his Attorneys May 17, 1927. 1,629,347
E. G. LAWRENCE
ALARM SYSTEM FOR VAULTS
Filed March 9, 1925   6 Sheets-Sheet 6
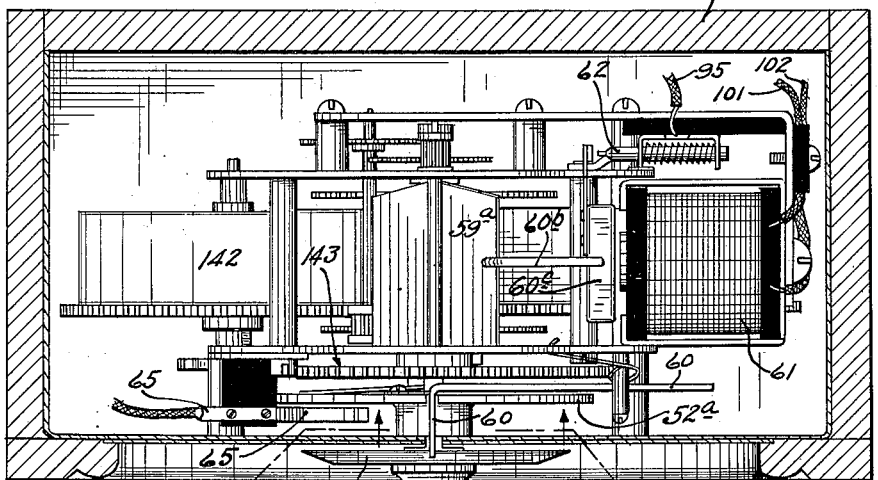
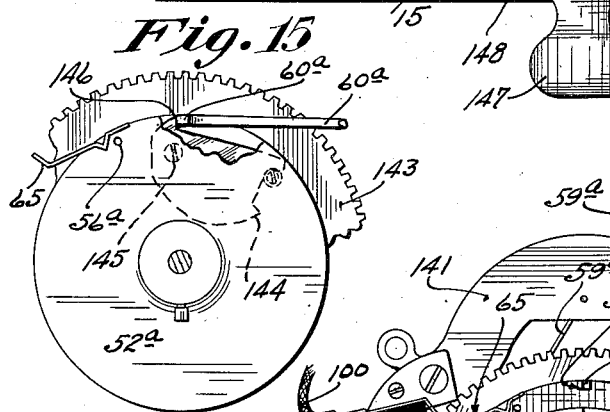
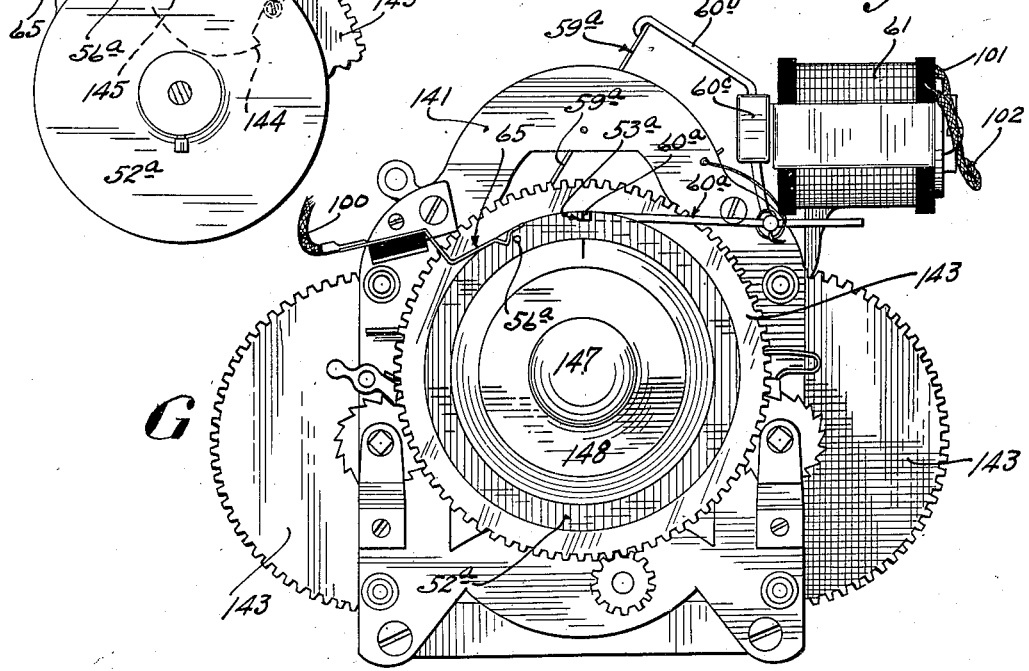
Inventor
Edward G. Lawrence
By his Attorneys Patented May 17, 1927.

1,629,347

UNITED STATES PATENT OFFICE.

EDWARD G. LAWRENCE, OF MINNEAPOLIS, MINNESOTA, ASSIGNOR TO O. B. McCLINTOCK CO., A CORPORATION OF MINNESOTA.

ALARM SYSTEM FOR VAULTS.

Application filed March 9, 1925. Serial No. 14,112.

My invention provides an improved burglar-protecting system especially adapted for application to or in connection with bank vaults, safety deposit vaults, and the like, and, generally stated, it consists of the novel devices, combinations of devices and relative arrangements of circuits and cooperating devices hereinafter described and defined in the claims.

The complete system here illustrated and hereinafter described embodies various novel devices and groups or arrangements of parts, certain of which may be independently used but which, nevertheless, are, in this system brought into a highly important cooperative relation and which may, to better advantage, be discussed and considered after first having described in detail the illustrated arrangement. Certain introductory statements, such as the following, may, however, be made to advantage.

The system is duplex in its character in that it protects against closing of normally open circuits and opening of normally closed circuits, and the arrangement is such that tampering with the one type of circuit does not put the other type of circuit out of protective action.

The complete system involves instruments or devices designated by the following names, to wit: a timed clock-driven contact, idle combination tumbler, trip and reset relay, electrical alarm gong, combination reset relay, cut-out signals, automatic cut-out and reset, balanced relays, vibration bell, and automatic test bell.

In the accompanying drawings, which illustrate the invention, like characters indicate like parts throughout the several views.

Referring to the drawings:

Figs. 1 and 1ᵃ are supplemental diagrammatic views illustrating a more complete embodiment of the invention, and which two views are adapted to be placed together to make up a complete diagram;

Fig. 2 is a detail in vertical section showing portions of a combination lock such as used in bank vaults and showing also a co-operating so-called tumbler-actuated "combination contact";

Fig. 3 is a horizontal section on the line 3—3 of Fig. 2;

Fig. 4 is a plan view of the combination contact shown in Figs. 2 and 3;

Fig. 9 is a side elevation of a device herein designated as the "cut-out" signal;

Fig. 10 is a front elevation of the cut-out signal shown in Fig. 9;

Fig. 11 is a vertical section taken on the line 11—11 of Fig. 10;

Fig. 12 is a vertical section taken on the line 12—12 of Fig. 10;

Fig. 13 is a view partly in plan and partly in horizontal section, showing an instrument herein designated as the "automatic cut-out and reset";

Fig. 14 is a side elevation of the instrument shown in Fig. 13, the case being removed therefrom; and Fig. 15 is a fragmentary section on the line 15—15 of Fig. 13, some parts being broken away and some parts being removed.

Figure 1:
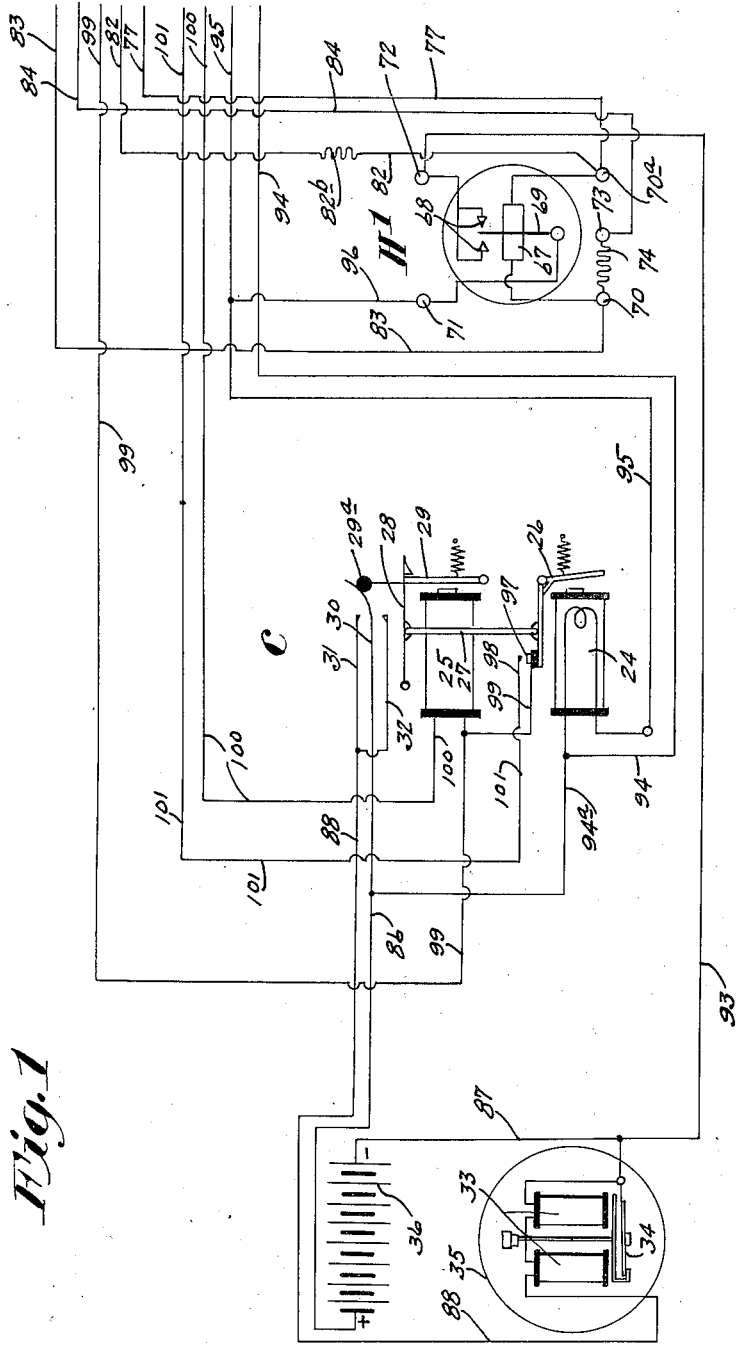

In the diagram views Figs. 1, and 1ᵃ, certain instruments or devices will be indicated as entireties by the following designations, to wit:

The character A indicates a timed or clock-driven contact; B indicates the idle tumbler of a combination lock such as used in bank vaults, safes and the like; C indicates an instrument known as a trip and reset relay, preferably such as known to the trade as the Kellogg trip and reset relay; D indicates an electrically actuated alarm gong of any well known or approved construction; E indicates an instrument herein designated as the "combination reset relay"; F indicates instruments herein designated as the "cut-out signals"; F', F²′ and F³ indicate cut-out signals very similar to the cut-out signals F, but connected and used in somewhat different ways; G indicates an instrument herein designated as the automatic cut-out and reset; H and H′ diagrammatically indicate balanced relays such as the Jewell or Weston; I indicates an electrically actuated bell or vibrator, which performs a highly important function in connection with the balanced relay H; and J indicates a test bell used in connection with the cut-out signal F³.

Of the instruments or devices above just noted, A, B, E, F, F', F², F³, H, I and J will be located within the vault, while the devices C, D and H' will be located in the alarm gong housing at the exterior of the vault, and usually located high up outside of the bank or building in which the vault is installed.

A. As shown, the timed or clock-driven contact A is in the form of a wheel or disc carried by a shaft 16 that is driven, at the rate of one complete rotation each twenty-four hours, from a suitable clock mechanism, which, preferably, will be an eight-day clock. Said contact is shown as provided with a peripheral segment 17 of insulating material and is provided with a metallic contact segment 18. The insulating segment 17 may be assumed to represent sixteen hours of movement, while the conducting segment 18 will represent eight hours of movement. Working on the peripheral surface of the contact A is a contact brush 19, and here it may be stated that the contact segment 18 will run in engagement with the contact 19 during the night or protective period, while the insulating segment 17 will run against the contact 19 during the working day or unprotected period.

B. The idle tumbler B of the combination lock has a peripheral notch 20 that cooperates with the depending end of an oscillatory contact blade 21. This blade 21 normally stands out of engagement with and midway between two spaced contacts 22 and 23.

C. The trip and reset relay C is of well known construction and, hence, for the purposes of this case, it is only desirable to describe the same briefly as comprising the following: The numerals 24 and 25 indicate, respectively, the trip and reset magnets thereof, which may be assumed to have a resistance each of one hundred ohms. The numeral 26 indicates a spring-retracted armature that cooperates with the magnet 24 and is provided with an arm, which, through a link 27, operates a pivoted latch 28, the hook-like end of which normally holds in an intermediate position a spring-retracted armature 29, which, in turn, is subject to the reset magnet 25. The armature 29 has an extended roller-equipped end 29ª that normally engages the curved end of an intermediate spring contact blade 30. When moved upward, the contact blade 30 will engage the free end of an upper contact 31, and when moved downward, it will engage the free end of a lower contact 32. The contacts 31 and 32 are directly connected but the contact 30 is normally electrically disconnected from the contacts 31 and 32.

D. The electrically actuated alarm gong D, as stated, may be of any suitable construction, but, as shown, it comprises magnets 33 and the usual vibratory armature 34 and gong proper 35.

As already stated, the trip and reset relay C and the alarm gong D will be placed in a suitable housing outside of the vault. Within the housing that contains the said devices C and D, there will also be placed a battery 36, which may be assumed to be a twelve-volt battery.

E. The combination reset relay, as shown, comprises two electromagnets 37 and 38, the former of which may be assumed to have a resistance of seven ohms, while the latter will have a resistance of but three ohms. The numeral 39 indicates an intermediate pivoted armature that is subject at different times to the said magnets 37 and 38. The armature 39 serves as a conductor and cooperates with fixed contacts 40—40 and 41—41.

F and F'. Each cut-out signal F and F', in the simple form diagrammatically illustrated, comprises an electromagnet 42, which may be assumed to have ten ohms resistance. Said magnet, as shown, is mounted on a plate 43 of insulating material. The numeral 44 indicates an armature that normally stands in a vertical position, as shown, for example, in Fig. 1ª, but which is adapted to be drawn to the left when the magnet 42 is energized. This armature 44 has a hook-like free end that normally engages under a shoulder of a lever 45 and holds said lever raised and in engagement with an electrical contact 46. At its free end, the lever 45 carries a segment or indicator plate or card 47, which, when dropped, gives a signal indicating that the circuits have been tampered with. Said lever 45 and plate 47 will be dropped when the armature 44 is drawn to the left, so that its hook-like end moves into a clearance notch or bulge formed in said lever 45.

F². The cut-out signal F² is or may be identical with the cut-out signal F and the corresponding elements are marked with the same numerals. In this arrangement, however, the contact 46ª, which corresponds somewhat to the contact 46 of the cut-out signal F, has slight vertical movement and is connected to an insulating block 48 from which projects a contact blade 49. In this device, there is also a lower contact 50 located below the lever 45; and when the magnet 42 is energized and the lever 45 drops, the contact 46ª will move downward slightly with said lever until the contact 49 engages an underlying contact 51, and under further downward movement, said lever 45 will leave the contact 46ª and come into engagement with the lower contact 50.

G. The automatic alarm cut-out and reset G, as diagrammatically illustrated, comprises a disc or wheel 52 that is spring or motor-driven in a clockwise direction in respect to Fig. 2 and has a lug 53 projecting from its periphery. The wheel 52 is carried by a shaft 54, which also carries a gear 55 and a radiating contact arm 56. As shown in said diagram view Fig. 1ª, the gear 55 meshes with an intermediate gear 57, which, in turn, meshes with a gear 58 that carries a speed-retarding fan blade 59. The said gears 55, 57 and 58 are complete gears and the mechanism just described is really a clock mechanism, the preferred arrangement of which will be hereinafter fully described. The numeral 60 indicates an armature lever that normally stands in the lowered position shown in Fig. 2 and in which position its free end engages the fan blade 59 and stops the movement of the clock mechanism. The armature lever 60 is subject to an electromagnet 61 and when raised, it engages a relatively fixed electrical contact 62. The magnet coil 61 may be and preferably has a resistance of ten ohms. For holding said lever 60 temporarily raised, so as to release the clock mechanism, and in electrical engagement with the contact 62, there is shown a gravity-held latch dog 63, the hook-like end of which works through a perforation in said lever 60 with its free end arranged to be engaged by the lug 53 of the wheel 52. The shaft 54, and hence the revolving contact 56, are electrically connected to the armature lever 60 by a wire 64. The outer end of the contact 56, slightly before the mechanism of the cut-out G is stopped in the position shown in Fig. 1ª, is arranged to engage a relatively fixed contact blade 65.

H and H'. The balanced relays H and H' are of the same construction and each may be assumed to be a Jewell or Weston balanced relay. Of the elements thereof, it is only necesary for the purposes of this case to note the enclosing case 66, the electromagnetic controller 67, relatively fixed spaced contacts 68 and contact needle 69. The controller 67 is connected on opposite sides to binding posts 70 and 70ª. The needle 69 is connected to the binding post 71 and the contacts 68 are both connected to a binding post 72. As shown, the binding post 70 is connected to another binding post 73 by a high resistance coil 74.

I. The vibratory bell I is connected on one side to the fixed contact 50 by a wire 75, and on its other side, said bell is connected to a wire 76 that leads to a source of current supply presently to be noted.

The vertically movable contact 49 is connected to the binding post 70ª of the balanced relay H', through a lead 77, in which, as shown, a rheostat 78 is interposed.

The numeral 79 indicates a battery, preferably of about one and one-half volts pressure, which, on one side, is connected to the binding post 70ª of the balanced relay H and on its other side is connected to the fixed contact 51 through a lead 80 in which a rheostat 81 is preferably interposed. The numeral 82 indicates the lead and the numeral 82ª indicates one of the conducting elements of the vault winding and which lead, as shown, is connected between the binding post 70ª of the balanced relay H' and one side of the battery 79, the said latter connection being made through the rheostat 81. The lead 82, as shown, includes a protective winding 82ᵇ that is incorporated in the housing that contains the devices C, D, H' and 36. The binding post 73 of the balanced relay H is connected by a lead 83 to the binding post 70 of the balanced relay H', and the binding post 70 of the relay H is connected by a lead 84 to the binding post 73 of the relay H', all as shown in Fig. 1ª. The battery 79 and rheostats 78 and 81, it will be understood, of course, are within the vault.

Located within the vault, there is a further important element, to wit: a battery 85, which may be and preferably is a six-volt battery.

*General scheme of wiring, illustrated in Figs 1 and 1ª.*

The outside battery 36, on the positive side, is connected by a lead 86 to the intermediate contact 30 of the trip and reset relay C and the negative side of said battery is connected by a lead 87 to one side of the electromagnets 33 of the gong D. At their other sides, said magnets 33 are connected by a lead 88 to the two relatively fixed contacts 31 and 32 of the relay C.

The coil of the magnet 42 of the first or combination cut-out signal F is connected on one side to the cooperating armature 44 and on the other side is connected by a lead 89 to the shaft 16 and contact segment 18 of the timed or clock-driven contact A. The coils of the magnets 42 of one or more other cut-out segments F' are connected at one side to the respective armatures 44 and on the other sides are connected by a common lead 90 to one side of the trip magnet 24 of the trip and reset relay C, said connection, as shown in the diagram view Fig. 1ª, being made through the contact 19. The common lead 90 is also connected to one side of the coil of the magnet 42 of the modified cut-out relay F², the other side of said coil being electrically connected to the vertically movable contact 46ª

The binding post 71 of the balanced relay H is, by a lead 91 and framework of the cut-out relay F², electrically connected to the armature 44 and to the lever 45.

It may now be noted that the lead 76, before described, extends and is connected to the positive side of the six-volt battery 85. From the negative side of the battery 85 extends a grounded or negative battery lead 92, which, by an extension lead 92ª, is connected to the binding post 12 of the balanced relay H. The binding post 72 of the balanced relay H', (which latter, it will be remembered, is located in the outside housing with the alarm gong D and battery 36), is, by a lead 93, connected to the negative side of said battery 36, said connection, as shown, being made through a portion of the lead wire 87.

By a lead 94, the positive side of the battery 85 is connected to the positive side of the coil of the trip magnet 24 of the trip and reset relay C, and by a branch lead 94ª, is connected to the intermediate contact blade 30 of said instrument C. The branch lead 94ª directly connects to the lead wire 86, which latter, in turn, as already noted, is connected to the positive side of the twelve-volt battery 36. The negative side of the coil of the trip magnet 24 is connected by a lead 95 to the fixed contact 62 of the automatic cut-out and reset G; and now it may be noted that said lead 95 is connected by a lead 96 to the binding post 71 of the balanced relay H'.

The extended arm of the bell crank armature 26 of the trip and reset relay C carries a contact 97 that is insulated therefrom and normally out of engagement with a relatively fixed contact 98. The negative side of the battery 85 is connected by a lead 99 to the contact 97 and to the negative side of the coil of the reset magnet 25 of the trip and reset relay C. The positive side of the coil magnet 25 is connected by a lead 100 to the contact brush or blade 65 of the automatic cut-out and reset G. The contact 98 is connected by a lead 101 to the negative side of the coil of the magnet 61, the positive side of said coil being connected to the positive side of the battery 85 through a lead 102. The lever 60 and the contact 56 are also connected to the positive side of the battery 85 through certain of the leads already described and through a lead 103.

The vibratory contact blade 21 of the tumbler mechanism B is connected to the grounded and negative side of the battery through a lead 104 and lead 92. The fixed contact 23 of the mechanism B is connected by a lead 105 to the contact 46 of the first or left-hand cut-out signal F, and by a lead 106 to the fixed upper contact 40 of the combination reset relay E. The fixed contact 22 of the instrument B is connected by a lead 107 to the lower fixed contact 41 of the instrument E. In Fig. 2, the numerals 106ª and 107ª indicate finger contacts such as usually provided between the door and casing of a vault, and which contacts are respectively located in the leads 106 and 107. One side of the magnet 37 of the instrument E is connected to the upper fixed contact 41 by a wire 109, and the other side of said coil is connected by a lead 110 to the positive side of the battery 85, as shown, through a portion of the lead 94. One side of the magnet 38 is connected by a lead 111 to the segment 18 of the clock contact A, and the other side of said magnet 38 is connected by a wire 112 to the lower fixed contact 40.

It should now be noted that the contact 46 of the cut-out signal F, (of which there may be several), and which latter is under timed control, is provided with a lead 113, which, as shown, extends to the contact 114 slightly separated from the grounded lead 92 so as to form gaps 115. This is simply a diagrammatic illustration of the scheme and it will be understood that gaps or openings in the circuit may be provided at various different places and in various different arrangements, which will normally leave said contacts 46 in open circuits and which open circuits, when accidentally or maliciously closed, as by tampering of the vault, will set the alarm into action, as hereinafter described.

J and F³. As a highly important feature, I provide an automatic "test device", which gives supervision over the system and will reliably indicate whether or not the various protective devices are in operative condition. Otherwise stated, this test device, as here illustrated, includes an electrically actuated "test bell" and the automatic cut-out signal F³, which latter, as already noted, is in its primary features like the cut-out signal F. The test bell, already designated by the letter J, is connected on one side by a wire 116 to the oscillatory contact 44, and the contact lever 45 of said instrument F³. On its other side, the bell J is connected by a wire 117 to a spring contact blade 118, (see Fig. 1ª), that is normally out of engagement with a cooperating fixed contact 119, which, in turn, is connected by a wire 120 to the negative or grounded lead 92. The contact blade 118, at its free end, has a cam lug 121, of insulating material. Here it may be stated that, whenever the vault door is either opened or closed, a collar on the door bolt 107ª will engage the cam lug 121 and force the contact blade into engagement with the contact 119.

In the cut-out signal F³, the contact 122, which corresponds in some respects to the contact 46 of the instrument F, is connected to an upper contact 123 by a plunger 124 that is free for slight vertical movements in suitable guides. Normally, the contact 122 rests on the lever 45 and the contact 123 engages the fixed contact 125, which, by a lead 126, is connected to the positive side of the battery 85 through a portion of the lead 76.

The lead wire 101 is connected by a wire 127 to one side of the coil of the magnet 42 of the cut-out signal F³, so that said magnet 42 is connected in multiple with the magnet 61 of the automatic cut-out and reset G, so that the said two magnets 42 and 61 will be simultaneously energized when the switch contacts 97 and 98 are engaged, and will be de-energized when said contacts 97 and 98 are separated.

Operation.

The several instruments preferably used are of somewhat complicated form, the details of which would be difficult to keep in mind while first getting the general scheme of the operation, and these will, therefore, be described more in detail after first tracing the operation of the mechanism and arrangement illustrated in the diagram views, Figs. 1 and 1ª, which illustrate the several instruments diagrammatically and in somewhat simplified form.

Figs. 1 and 1ª illustrate the normal conditions of the several instruments, that is, the conditions that exist when the system is in order, is under protection of the various different devices, and the several devices are at rest but ready to cause the sounding of an alarm whenever the system is in any way tampered with.

Here it may be stated that the cut-out signal F will be operated only when the combination lock is tampered with during a time that the system is under protection from the clock A, that is, during the interval of time that the conducting segment 18 is in contact with the fixed contact 19; that the cut-out signals F' and F² will be operated at all times, either day or night, and irrespective of whether or not the clock contact A is operating under its protecting period; and that the cut-out signals F³ will be operated whenever any one of the cut-out signals F, F' and F² are operated, for the reason that the said cut-out F³ and bell J are connected in multiple with all of the said other cut-out devices.

Combination lock protection.

In the setting of the combination lock, the idle tumbler B will be set as shown in Fig. 1ª in what is known as a "safety number" position, and in such position, the free end of the oscillatory contact 21 will be free within the notch 20 and said contact 21 will then be midway between the contacts 22 and 23, so that said contact 21 will then be in an open circuit. If, however, the tumbler B is moved slightly in either direction, the contact 21 will be engaged either with the contact 22 or 23. As is well known, a combination lock cannot be operated without oscillating the tumblers first in one direction and then in the other, and any such attempted manipulation must of necessity cause the contact 21 to engage the contact 23, and this will close the multiple circuits as follows: From the grounded or negative lead 92 through the lead 105, contact 46, lever 45, magnet coil 42, and lead 89, to the clock-driven contact A; and from said contact 23 through the lead 106, door bolt 106ª, lever 39, lead 102, magnet 38, lead 111, and a portion of said lead 89, also to the clock-driven contact A. If, at the time when said contact 21 was moved into engagement with the contact 23, as just stated, the conducting segment 18 of the clock-driven contact A was then in engagement with the contact 19, then the two multiple circuits above just traced in part will be connected to the positive side of the battery 85 as follows: Through the lead 95ª—95, magnet 24, and lead 94, to the positive side of said battery. This will close the circuit through the magnet 42 of the instrument F, the magnet 38 of the instrument E, and the magnet 24 of the instrument C, but since the said magnets 38 and 42 are in series with the magnet 24 and the latter has the relatively high resistance of one hundred ohms, the current flowing through the magnets 42 and 38 will not be sufficient to operatively energize the same, but will be sufficient to energize said magnet 24. When the magnet 24 is energized, it draws the armature 26 and, through the link 27, lifts the latch-acting contact 28 and releases the spring-retracted armature 29. When the said armature 29 is released, its insulated head 29ª moves out of engagement with the central contact 30 and the latter, under its own spring tension, will move into engagement with the contact 32. This closes the circuit from the battery 36 through the magnets 33 of the alarm bell D and causes the sounding of the alarm.

When the magnet 24 was energized and the armature 26 moved, as just above noted, the contact 97 was engaged with the contact 98, thereby closing the battery 85 through the magnet 61 of the automatic cut-out and reset G, through the following connections: from the negative battery lead 99 through the contacts 97—98 to the lead 101, and through the coil 61 to the positive side of the battery 85 through the lead 102 and a portion of the lead 94. When the magnet 61 is thus energized, it raises the lever 60, thereby releasing the speed-retarding blade 59 and thereby releasing the clock mechanism. Lifting of the lever 60 as just stated also engages the lever 60 with the fixed contact 62, thereby short-circuiting the magnet 24 and throwing all of the energy of the battery 85 through the magnet 42 of the cut-out signal F and through the magnet 38 of the combination reset relay E. When the magnet 42 of the instrument F is thus energized, it draws the armature 44 toward the left, thereby causing the latter to release and drop the cooperating lever 45 so that the circuit will then be broken between the contact 105 and the dropped lever 45. When the magnet 38 is energized as just stated, it moves the lever 39 into the dotted line position shown in Fig. 1ᵃ, thereby breaking the circuit between the contacts 40—40, and electrically connects the contacts 41—41 so that the circuit between the latter will be subsequently closed in a manner presently to be noted. When the magnet 42 of the cut-out signal F was energized as stated and the cooperating lever 45 was dropped, it broke the circuits through said magnet 42 of the instrument F, through the magnet 38 of the instrument E, and through the magnet 61 of the instrument G, and through the magnet 24 of the instrument C, and the said magnets were instantly de-energized. When the magnet 61 was de-energized, the lever 60 dropped far enough to break the contact 62, but was caught by the dog 63 and held slightly above the position in which it intercepts the movement of the clock-driven blade 59. When the magnet 24 was de-energized, the armature 26 was instantly restored to the normal position shown in Fig. 1, thereby breaking the circuit between the contacts 97 and 98 and causing the latch-acting lever 28 to move down into a position to catch the armature 29, which latter, however, for the time being, remains in a position to the right of that shown in Fig. 1.

It will be assumed that the clock mechanism is timed so that the clock-driven wheel 52 is arranged to be given one rotation in fifteen minutes. When the wheel 52 has been rotated slightly less than fifteen minutes, the rotating contact 56 will be brought into engagement with the contact 65 and this, for a very short interval of time, will close the circuit through the reset magnet 25 of the instrument C as follows: from the positive side of the battery 85 through a portion of the lead 94, leads 102, 103, and 64, to the contacts 56 and 65, and from thence through the lead 100 to the magnet 25 and from the magnet 25 back to the battery through the lead 99. When the reset magnet 25 was thus energized, it pulled the armature 29 back to the position shown in Fig. 1, in which position it will be again secured by the latch lever 28, and movement of said armature back to normal position restored the contact 30 to its neutral position, thereby breaking the circuit through the alarm bell and stopping the action thereof. This, as it will be noted, gave an alarm during a period of approximately fifteen minutes. Immediately after the contact 56 is moved out of engagement with the contact 65, the lug 53 of the disc 52 will engage the lower end of the latch 63 and thereby cause the same to drop the lever 60 so that the latter will then intercept rotation of the blade 59 and stop the clock mechanism with the parts in the positions shown in Fig. 1ᵃ.

It may now be understood that, when the lever 39 was moved from its full line position into its dotted line position, Fig. 1ᵃ, as above described, it was in what may be termed a cut-out position, but in which position it connects the contacts 41 so that the reset magnet 37 will be energized if further attempt should be made to manipulate the combination lock and thereby cause the contact 21 to engage the contact 22. When the reset magnet 37 is energized, it moves the armature 39 back to the full line position, so that the alarm will be again set into action just as above described, if the contact 21 is thereafter moved into engagement with the contact 23, which action will necessarily follow any attempt to work the combination lock B. Attention is further called to the fact that, while the sounding of the alarm by manipulation of the lock can take place only during the protected period controlled by the clock, the resetting of the armature 39 can take place at any time. Otherwise stated, the circuit through the contact 23 must be through the clock-controlled contact, while the circuit through the contact 22 is not through the clock-controlled contact. From the foregoing, it follows that if a burglar, for example, should set off the alarm through the contact 23, as above described, and should escape and later return to again tamper with the safe or vault, he would find the protecting system set and ready to indicate any further tampering.

As already indicated, there may be any desired number of cut-out signals F'. This instrument F' is in an open circuit, which includes the gap 115. This gap 115 may be assumed to be the space between the elements of the vault wall or of the vault door, such as the usual spaced plates, and it may be here stated that the cut-out signal F' will be operated whenever the said gap 115 is electrically closed by any means whatsoever, such, for example, as the use of a drill. When the gap 115 is closed, the circuit through the magnet 24 of the trip and relay reset C will be energized and the above described operations of the said instrument C, gong D, automatic cut-out and reset G, which took place under the clock-controlled action as above described, will be repeated except that, in this instance, it will be the lever 45 of the cut-out signal F' that will be dropped; but in this action, the combination reset relay is not brought into action. The said instrument E operates only in connection with the contacts 21, 22 and 23. Here attention is called to the fact that the magnets 42 of the cut-out signals F' and F² are connected to the positive side of the battery 86, as shown, through the leads 90, 95ᵃ, 95, contact 19, and magnet 24. Of course, it follows from what has been said that, when the magnet 24 of the instrument C is energized by closing of the gap 115, the gong will be set into action and will, under the action of the timed automatic cut-out and reset G, be sounded for a period of fifteen minutes and then cut out of action.

The levers 45 of the cut-out signals F, F', F² and F³ all require to be reset by hand, and under operations so far described, the levers 45 of the instruments F and F' have been dropped. Dropping of the lever 45 of the instrument F does not throw the combination lock protection out of action because of the action of the combination reset relay E, but when the lever 45 of the instrument F' is dropped, it is temporarily out of action. However, in the vault-protecting system, usually more than one of the instruments F' will be connected for action on the plan described. Even after the instrument F' has been tripped and the alarm sounded for a fifteen minute period, any interference with the wiring or system other than at the gap 115 will set the alarm into action. The said instrument F' and others connected in like manner only protect the vault against closing of normally open circuits.

The instruments F², H and H' protect the vault against breaking of normally closed circuits. These normally closed protecting circuits incorporated in the vault linings are protected by balanced relays and cooperating devices arranged to cause the alarm to be sounded whenever any of the closed circuits are either shorted or broken or, in fact, whenever the current maintained in the closed circuits is materially increased or decreased. From this it follows that, if the battery supply current to the normally closed circuits should be run down or be removed, or if a battery of a higher voltage should be substituted, the alarm device will be thrown into action. The arrangement whereby the above noted action will take place may be made clear by the following illustrations.

Suppose, for example, that the vault lining lead 82 be broken. Normally, of course, the relays H and H' are balanced, one against the other, so that the oscillatory contacts 69 of both will be in neutral positions, that is, midway between the contacts 68. When the lead 82 is broken, the current flow from the battery 79 through the electromagnetic controllers 67 of the two relays will cease and the pointers 69 of both relays will move against the low side contacts 68, thereby closing the circuits as follows: from the negative lead 92ª through the instrument H, thence through the lead 91, the lever 45 of the instrument F², through the plunger contact 46ª, through the coil 42 of the instrument F² and to the positive side of the battery 85 through the leads 90, 95, coil 24 of the instrument C and thence through the lead 94 to the positive side of said battery 85. By this action just noted, the magnet 24 of the trip and reset relay C will be energized, and by actions already described, the gong D will be set into action. Simultaneously with the action just described, the contact 69 of the balanced relay H' closed the circuit through the magnet 24 and battery 36, so that the magnet 24 is, by the actions just described, simultaneously connected with both batteries 85 and 36. These two independent actions, simultaneously performing the same function, would not be necessary except for the fact that the cable might be cut, in which case, the battery 85 could not close the circuit through the magnet 24, for it will be remembered that all of those parts illustrated on Fig. 1 are outside of the vault and preferably within an alarm housing outside of the bell; while all of those parts on Fig. 1ª are within the vault and, of course, the leads connecting the parts inside of the vault with those outside of the vault will naturally be carried in a cable. With the two balanced relays, one within the vault and one outside of the vault, the magnet 24 of the trip and reset relay C will, if the cable should be cut, be energized by the battery 36, which is within the alarm housing. Of course, when the magnet 24 is energized by actions resulting from the breaking of the lead 82, as just described, the trip and reset relay C will operate in the manner already several times described and will sound the alarm D and set the automatic cut-out and reset G into action with the resulting operations previously described, and which will energize the coil 42 of the cut-out signal F² at the same time that the magnet 61 of the instrument G is energized. When the said magnet 42 is energized, it draws the cooperating armature 44 to the left, thereby causing the lever 45 to drop into engagement with the underlying contact 50. When the lever 45 drops, the contact 46ª will move slightly downward but will not follow the lever 42 so as to maintain contact therewith, but the contact 49 will drop onto the contact 51. Engagement of the lever 45 with the contact 50 starts the vibration bell I into action. Engagement of the contact 49 with the contact 51 bridges the gap assumed to be made in the lead 82 by substituting the lead 77, rheostat 78, and lead 80 for the broken lead; and this allows the relay to come back into balanced position, so that the alarm will be cut out of action at the end of fifteen minutes when the clock-driven disc 52 of the instrument G completes its rotation and again comes back into the position shown in Fig. 1ª.

Figure 8:
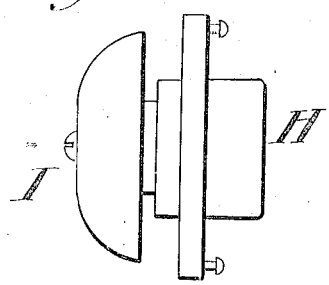
Fig. 8 is a plan view showing one of the balanced relays and an associated bell or vibrator.

The balanced relays are very delicate instruments in which the contacts are quite likely to stick when brought into engagement, but which may be dislodged or loosened by comparatively light vibrations. I have found that the vibration produced by a bell, electromagnetic buzzer or the like, will be sufficient to prevent sticking of the contacts of these relays and, hence, as a convenient vibration producer, I have used a small electric gong or bell I located closely in the vicinity of the relay H and which, to increase the efficiency thereof, is attached to the back of said relay as shown in Fig. 8. The relay H' is located so closely in the vicinity of the main gong D that its contacts will be prevented from sticking by vibrations produced by said gong. From the description given, it is, of course, understood that both of the said bells I and D will be set into action substantially simultaneously with the operations of the respective relays H and H', so that they will perform the important functions stated.

As several times indicated, the levers 45 of the several cut-out signals F, F', F² and F³ must be reset manually. They must, however, be simultaneously reset and, in practice, it is the custom to provide a common device for simultaneously resetting all thereof, that is, for lifting the same back into positions in which they will be caught and held, as shown in Fig. 1ª, by the cooperating hook-acting contacts 44.

It will be remembered that the magnet 42 of the cut-out F³ is connected in multiple with the magnet 61 of the automatic cut-out and reset G, so that the said two magnets will be simultaneously energized and simultaneously de-energized. It should also be recalled that the circuit of the magnet 61 is arranged to be closed when the armature 26 is moved by the energized magnet 24, and that the circuit of said magnet 24 will be closed in one of the three ways indicated, to wit: by engagement of the contacts 21 and 23 of the instrument B, by closing of the gap 115 of the instrument F', or by disturbances either by way of increase or decrease of current in the balanced relays H and H'. It is now important to consider that the magnet 42 of the instrument F³ will be energized and the cooperating lever 45 will be dropped whenever the magnet 61 is energized through any one of the three sources just above recited.

It will now be noted, by reference to Fig. 1ª, that the circuit from the positive to the negative of the battery 85 through the test bell J is normally closed except between the door-bolt-actuated contacts 118 and 119. This test bell will be sounded only when all of the instruments F, F', F², and F³ are in normal conditions, as illustrated in Fig. 1ª, and then only when the door of the vault is opened or closed so as to force the contact 118 into engagement with the contact 119, at which time the closed circuit through said test bell will be as follows: from the positive battery lead 76 through the wire 126, through the contacts 125, 123, 122 and 44, and lead 116, to the bell J, and from the bell through the lead 117, contacts 118 and 119, and the lead 120, to the negative battery lead 92. If then the test bell J rings when the door of the vault is opened or closed, the operator will know that the system is in operative condition and that no one of the instruments F, F' or F² has been dropped or operated.

If any one of the said instruments F, F', F² has been dropped or operated and the actions described have resulted therefrom, the magnet 42 of the instrument F³ will have been energized simultaneously with the energizing of the magnet 42 of one of the said operated instruments, and if such has occurred, the contact 44 of the instrument F³ will have been moved, the lever 45 dropped, and the contact 23 moved downward so as to break the circuit through the test bell J In this event, when the door of the vault is opened or closed, the test bell J will not be sounded, and this will indicate that the system is not in complete operative condition. When the lever 45 of the instrument F³ has been dropped as just stated, the contacts 23—22 move downward therewith far enough to disengage the contact 23 from the contact 25, but not far enough to maintain engagement between the contact 122 and the lever 45, and this breaks the circuit through the magnet 42 of said instrument F³ so that it can be reset.

In Fig. 2, the numeral 128 indicates the case of a combination lock, such as used in safe vaults, and in which, of course, the idle tumbler B is located. In this arrangement, the oscillatory contact 21 is attached with its other end to the head of a cylindrical contact support 129 mounted on the case 128 and to which the contacts 22 and 23 are attached, the said contacts 22 and 23 being, as shown, in the form of nut-equipped binding posts to which the wires 107 and 105, respectively, are attached.

Figure 5:
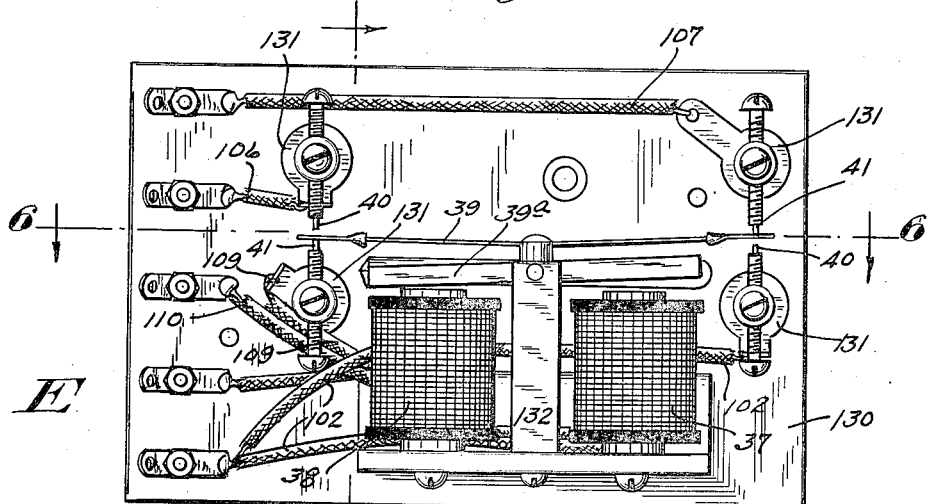
Fig. 5 is a plan view of a device herein designated as the "combination reset relay"
Figure 6:
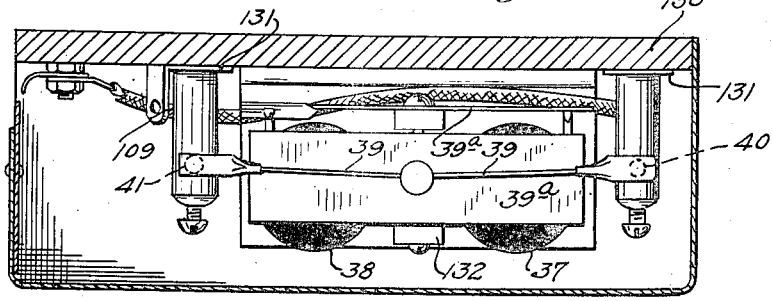
Fig. 6 is a horizontal section on the line 6—6 of Fig. 5.
Figure 7:
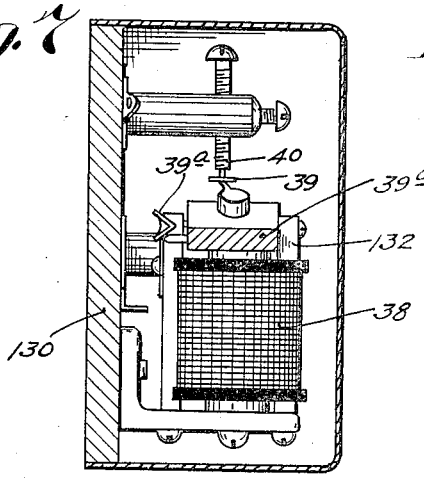
Fig. 7 is a vertical section on the line 7—7 of Fig. 5.

In the form of automatic cut-out of the combination reset E shown in Figs. 5, 6 and 7, the numeral 130 indicates a suitable casing in which the magnets 37 and various other parts are mounted. As here illustrated, the contacts 40—40 and 41—41 are in the form of contact screws applied through binding posts 131. The armature-acting contact 39, as here shown, is in the form of a spring blade intermediately attached to an armature proper 39ª that is intermediately pivoted to a support 132 and is directly subject to the magnets 37 and 38.

Figs. 9, 10, 11 and 12 illustrate the preferred construction of the so-called cut-out signals, several of which are shown in Fig. 10. In this construction, the lever 45 is bifurcated and carries a contact blade 133 that is normally engaged by the spring-retracted contact-acting armature 44, which latter is, as shown, pivoted to a plate 134 secured to a supporting bracket 135. The segmental plates 47 at the ends of the levers 45 are folded so that they are adapted to hold a card, not shown, on which will be marked the designated indication of the particular signal device. As here shown, the contact 46 is a spring-pressed plunger working through an insulated plate 136 secured on the plate 134. For simultaneously resetting the levers 45 of the several signals, there is here shown as provided a resetting bail 137 pivoted to the bracket 138 and having an arm that is subject to a resetting plunger 139.

The automatic cut-out and reset G shown in Figs. 13, 14 and 15, comprises an enclosing casing 140 within which the mechanism is enclosed. This mechanism comprises a sort of clock frame 141, from which the magnet 61 is rigidly supported. The disc 52$^a$ which corresponds to the previously described disc 52, is driven from a spring motor 142 through a chain of gears 143, and said disc, instead of having a projecting lug, is provided with a notch 53$^a$. The disc 52$^a$ carries a contact pin 56$^a$ that takes the place of the previously described contact 56, which engages the contact 65 to perform functions already described. The lever 60$^a$, which takes the place of the lever 60, is provided with an arm 60$^b$, the hooked end of which normally engages the fan blade 59$^a$, which latter corresponds to the blade 59. The arm 60$^b$ carries an armature 60$^c$ that is directly subject to the magnet 61. The lever 60 has a laterally bent end that normally engages in the notch 53$^a$. When the magnet 61 is energized, the laterally bent end of the lever 60$^a$ is raised out of the notch 53$^a$ and the hooked end of the arm 60$^b$ is disengaged from the fan blade 59$^a$, so that the motor-driven mechanism is then free for action to impart rotation to the disc 52$^a$. The numeral 144 indicates a sort of a dog that is pivoted to the disc 52$^a$ at 145 for limited oscillatory movement, and is provided with an outstanding lug 146 with which the laterally bent end of the lever 60$^a$ engages when it drops into the notch 53$^a$. When the lever 60$^a$ is raised, the lug 146 falls under the laterally bent end thereof and prevents the same from instantly entering said notch. When, however, the disc 52 has been given a complete rotation, the laterally bent end of the lever 60$^a$ engages the lug 146 and forces the same backward so that the laterally bent end of said lever may drop into the notch 53$^a$ and thus permit the hooked end of the arm 60$^b$ to re-engage the fan blade 59$^a$ and thus stop the further rotation of the disc 52$^a$ when it has completed its rotation. As shown, an operating knob 147 and dial 148 are attached to and projected axially from the disc 52$^a$ and are located at the exterior of the casing 140. The dial is marked to indicate the normal position of the disc 52$^a$. By the use of the knob 147, a person on the interior of the vault may rotate the disc 52$^a$ so as to reset the system without waiting for the fifteen minute period of alarm to expire.

In summary, the following statements may be pertinent.

In the above described system, the sounding of the alarm may be accomplished by closing of the circuits through the inside battery or the outside battery, or both. The contact points may be removed from either of the balanced relays and still the alarm will sound, thus producing a duplicate set of contacts where they are most vital. By this arrangement, open circuit supervision is given over the closed circuits and closed circuit supervision is given over the open circuits.

The battery 79 for the closed circuit is located in the control cabinet within the vault and should be of very low potential, say, one and one-half volts. Preferably, then, the relays are balanced on two milliamperes, so that the battery consumption is almost negligible. The flow of current is from the battery through a rheostat, inside balanced relay, vault linings, vault doors, cables, housing lining, outside balanced relay, and back through two wires in the cable with two resistance coils connected in multiple, one in the housing and the other in the control cabinet, and thence back to said battery 79. A fourth wire, such as the lead 77, is used in the cable and so arranged that it will automatically replace the path disturbed by cutting a wire in any one part of the linings, thus automatically restoring the balanced relay contacts and resetting the system. By this method, the cable is never left without closed-circuit protection. The sounding of the alarm is accomplished by either or both of the balanced relays. The contacts on the balanced relay that is within the cabinet and vault close the open circuit trip through the inside six-volt battery 85, and the contacts on the outside balanced relay close the open circuit through the outside battery 36.

The automatic cut-out and reset is made to operate on the principle of a clock movement. It is kept in a wound condition and is electrically released by closing the contacts controlled by the said trip and reset relay, after and not before the gong is set ringing because of a tripped condition of the relay, and the original source or cause has nothing to do with maintaining the gong in action but is due simply to a timed action. Hence, after the gong has once started ringing, it must continue to ring for its full period, irrespective of whether or not the cause that started its ringing has been removed.

Attention should have been called to the fact that the normally dormant lead 77 is, by its rheostat 78, adjusted so that it has the same electrical resistance as does that portion of the normally closed circuit that is cut out when the protecting lead or circuit 82 is broken. This is important because, when the circuit is directed through said lead 77, the two balanced relays H and H' will be restored to normal or neutral positions, so that the resetting of the system can be readily accomplished. The importance of connecting the balanced relays, so that the alarm circuit will be closed and the gong sounded by closing of a circuit from the outside battery 36 through the outside balanced relay H', in case the cable leads are cut, will, of course, be readily appreciated. Otherwise stated, the two balanced relays and the inside and outside batteries supply two sources from which the alarm may be sounded, and also provide automatic means for replacing the broken protective circuit, so that the system may be reset for repeated action if any other protecting circuit be tampered with. The leads 83 and 84 are connected in multiple with the high resistance coils 74, but in series with the protecting circuits, and this prevents crossing of any of the adjacent wires or breaking of any protecting circuit, such as the leads 82, 83 and 84, without sounding the alarm. The inside battery 85, for the purpose of statement, may be treated as the local battery to distinguish it from the remote or outside battery.

It is thought that the following very condensed statements of the sequence of actions that take place in the system may be helpful:

Closing of the circuit between 21 and 23, or of the gap 115, or breaking or increasing the pressure in the circuits to H and H', closes the circuit through the magnet 24, through the magnet 38, and through one or the other of the magnets 42, but operatively energizes only the magnet 24.

The energized magnet 24 moves the armature 26 and (a) closes the circuit at 30—32, sounding the alarm D, and (b) closes the circuit at 97—98, energizing the magnet 61 of the instrument G.

The energized magnet 61 closes the circuit between 60—62, thereby shunting out the high resistance magnet 24 through the leads 99 and 101, throwing the entire current from the battery 85 through the relatively low resistance magnets 42 and 38. The energized magnet 61, by lifting the lever 60—60 into engagement with the contact 62, starts the timed mechanism G into action.

The energized magnet 42 drops the cooperating lever 45, breaking the circuit through 42, and the energized magnet 38 reverses the armature lever 39, breaking the circuit through said magnet 38.

Just before termination of the fifteen minute alarm period, the contact 56 engages the contact 65, closing the circuit through the reset magnet 25 of the instrument C by way of the leads 99 and 100, thereby cutting out the gong D and resetting the instrument C.

The magnet 42 of the cut-out signal F³ is shunted across the leads 100 and 102, so that it will be energized whenever the magnet 61 of the instrument G is energized.

From the description given and the statements made, it will be understood that the devices and arrangements illustrated in the drawings are capable of a large range of modification within the scope of the invention as herein disclosed and broadly claimed.

What I claim is:

1. In an alarm system, a plurality of normally open protective circuits, an alarm, normally latched means for operating said alarm through successive cycles of predetermined periods, means operated by the closing of any one of said protective circuits for releasing said latched means, said system also including means for opening the disturbed closed protective circuit at a point other than at the point of first closure and some time during each cycle.

2. In an alarm system, a plurality of normally open protective circuits, an alarm, normally latched means for operating said alarm through successive cycles of predetermined periods, means operated by the closing of any one of said protective circuits for releasing said latched means, said system also including means for opening the disturbed closed protective circuit at a point other than at the point of first closure and some time during each cycle, and reset means operated by said normally latched means, when the latter is closed and during its cycle of operation, for cutting said alarm out of action and resetting the system for repeated like actions when a second protective circuit is closed.

3. In an alarm system, a plurality of normally open protective circuits, an electromagnetic alarm circuit, normally latched means for closing said alarm circuit through successive cycles of predetermined periods, electro-magnetic means operated by the closing of any one of said protective circuits for releasing said normally latched means, said system also including electro-magnetic means for opening the disturbed closed protective circuit at a point other than at the point of its first closure and at some time during its cycle.

4. In an alarm system, a plurality of normally open protective circuits, an electro-magnetic alarm circuit, normally latched means for closing said alarm circuit through successive cycles of predetermined periods, electro-magnetic means operated by the closing of any one of said protective circuits for releasing said normally latched means, said system also including electro-magnetic means for opening the disturbed closed protective circuit at a point other than at the point of its first closure and at some time during its cycle, and reset means operated by said normally latched means, when the latter is closed and during its cycle of operation, for cutting said alarm circuit out of action and resetting the system for repeated like actions when a second protective circuit is closed.

5. In an alarm system, a plurality of normally open protective circuits, a normally open electro-magnetic alarm circuit including a gong, normally latched means including an electro-magnetic tripping device and an electro-magnetic reset device, said normally latched means operating through successive cycles of predetermined periods, first to actuate said tripping device and close the alarm circuit, second to open the disturbed closed protective circuit at a point other than at the point of first closure and at some time during its cycle, and third to open said alarm circuit and operate said reset device to reset said trip device for repeated operation when a second protective circuit is closed.

6. The structure defined in claim 5 in which said reset device includes an electro-magnet, a co-operating armature and a latch for the latter, said armature being an element that is normally latched and normally holds said alarm circuit open.

In testimony whereof I affix my signature.

EDWARD G. LAWRENCE.